US012586951B2

(12) United States Patent     (10) Patent No.: US 12,586,951 B2

Seimiya     (45) Date of Patent: Mar. 24, 2026

(54) CONNECTION APPARATUS FOR ELECTRICAL CONNECTION WITH A PORTABLE DEVICE

(71) Applicant: YA-MAN LTD., Tokyo (JP)

(72) Inventor: Masao Seimiya, Tokyo (JP)

(73) Assignee: YA-MAN LTD., Tokyo (JP)

( * ) Notice: Subject to any disclaimer, the term of this patent is extended or adjusted under 35 U.S.C. 154(b) by 285 days.

(21) Appl. No.: 18/261,914

(22) PCT Filed: Dec. 22, 2021

(86) PCT No.: PCT/JP2021/047515

§ 371 (c)(1),
(2) Date: Jul. 18, 2023

(87) PCT Pub. No.: WO2022/158232

PCT Pub. Date: Jul. 28, 2022

(65) Prior Publication Data

US 2024/0079820 A1     Mar. 7, 2024

(30) Foreign Application Priority Data

Jan. 19, 2021    (JP) ................................. 2021-006468

(51) Int. Cl.
    H01R 13/62       (2006.01)
    H01F 7/02       (2006.01)
          (Continued)

(52) U.S. Cl.
    CPC ........... H01R 13/6205 (2013.01); H01F 7/02 (2013.01); H01R 11/30 (2013.01); H02J 7/0044 (2013.01)

(58) Field of Classification Search
    CPC ........ H01R 11/30; H01R 13/6205; H01F 7/02
    See application file for complete search history.

(56) References Cited

U.S. PATENT DOCUMENTS 7,658,613 B1* 2/2010 Griffin ............... H01R 13/6205
                                        439/39
9,478,901 B2* 10/2016 Chen ...................... H01R 13/22
                    (Continued)

FOREIGN PATENT DOCUMENTS

JP       07-085923 A     3/1995
JP       07-263078 A    10/1995
                   (Continued)

OTHER PUBLICATIONS

Office Action issued on Oct. 17, 2023, in corresponding Japanese Application No. 2021-006468, 9 pages.
                   (Continued)

*Primary Examiner* — Oscar C Jimenez
(74) *Attorney, Agent, or Firm* — Maier & Maier, PLLC

(57) ABSTRACT

A connection apparatus that can easily and reliably establish an electrical connection with a portable device. A connection apparatus that electrically connects with a portable device. The connection apparatus is provided with a first electrode, a second electrode, and a fixing member. The first electrode is conductive and has magnetic force. The second electrode is conductive and has magnetic force. The fixing member is configured so as to be capable of fixing the first electrode and second electrode at an interval according to the portable device.

14 Claims, 17 Drawing Sheets

(51) Int. Cl.
  *H01R 11/30*        (2006.01)
  *H02J 7/00*         (2026.01)

(56)                References Cited

U.S. PATENT DOCUMENTS

| | | | | |
|---|---|---|---|---|
| 9,838,085 | B2 * | 12/2017 | Bosscher | ................. H04B 5/26 |
| 2007/0072442 | A1 * | 3/2007 | DiFonzo | ............ H01R 13/6205 |
| | | | | 439/39 |
| 2017/0093087 | A1 * | 3/2017 | Esmaeili | ............ H01R 13/6205 |
| 2021/0111510 | A1 * | 4/2021 | Lee | ........................ H01R 13/24 |
| 2022/0052481 | A1 * | 2/2022 | Pon | .................... H01R 13/6205 |

FOREIGN PATENT DOCUMENTS

| | | | |
|---|---|---|---|
| JP | 10-225000 | A | 8/1998 |
| JP | 2003168485 | A | 6/2003 |
| JP | 2010-113957 | A | 5/2010 |
| JP | 2010531035 | A | 9/2010 |
| JP | 2017-147807 | A | 8/2017 |
| JP | 2020-017439 | A | 1/2020 |

OTHER PUBLICATIONS

International Search Report issued on Mar. 1, 2022, in corresponding International Application No. PCT/JP2021/047515; 6 pages.
Office Action issued on Feb. 13, 2024, in corresponding Japanese Application No. 2021-006468, 12 pages.

\* cited by examiner

CONNECTION APPARATUS FOR ELECTRICAL CONNECTION WITH A PORTABLE DEVICE

FIELD

The present invention relates to a connection apparatus.

BACKGROUND

Many portable devices have batteries. A portable device with a battery needs to be charged, which is often a complicated process. Consequently, a technology for easily connecting a portable device with a charger using a magnet is proposed (see Patent Document 1).

Patent Document

[Patent Document 1] JP 2017-147807 A

SUMMARY

However, when a magnet is used to connect a portable device to a charger, a situation may still exist in which an electrode is not always in contact even if the magnet is adsorbed to the portable device.

In view of the above circumstances, the present invention provides a connection apparatus capable of easily and reliably establishing an electrical connection with a portable device.

According to an aspect of the present invention, a connection apparatus for electrical connection with a portable device is provided. The connection apparatus comprises a first electrode, a second electrode, and a fixing member. The first electrode is conductive and magnetic. The second electrode is conductive and magnetic. The fixing member is configured to fix the first electrode and the second electrode at an interval corresponding to the portable device.

According to one aspect of the invention, electrical connection with a portable device can be easily and reliably performed.

Furthermore, miniaturization of the device becomes easy as well.

DETAILED DESCRIPTION

Hereinafter, embodiment of the present invention will be described with reference to drawings. Various features described in the embodiment below can be combined with each other.

1. First Embodiment

Figure 1:
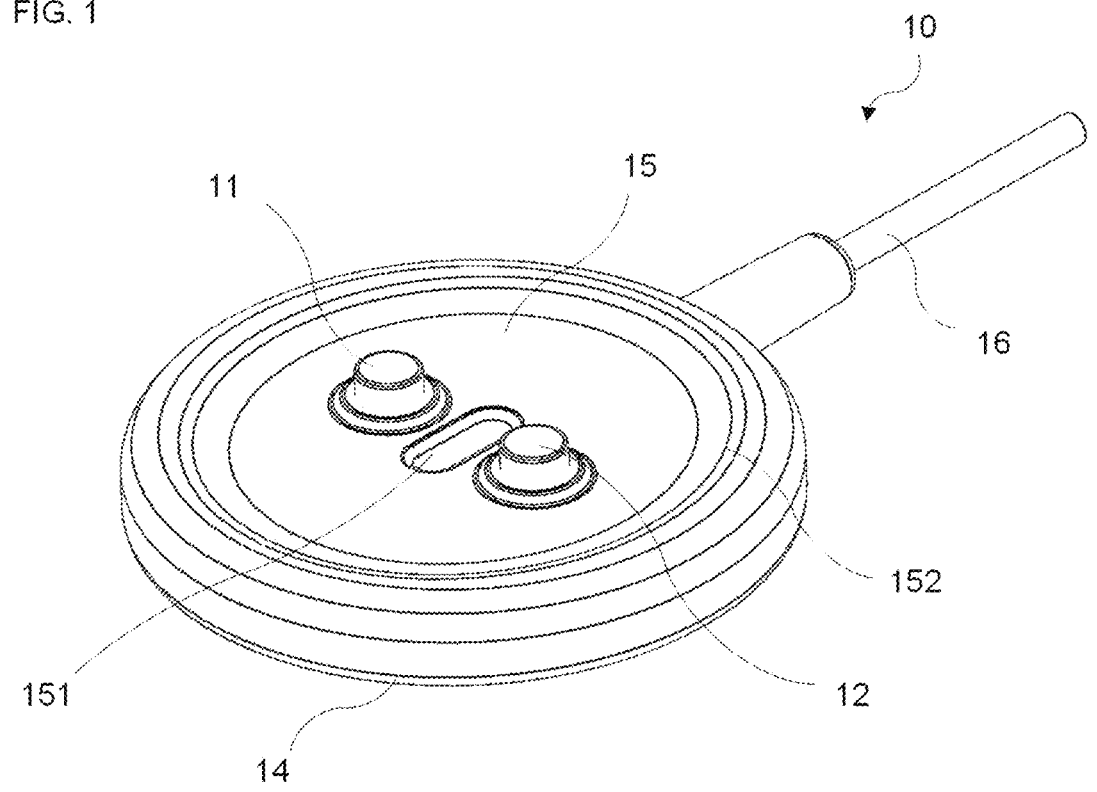
FIG. 1 shows an appearance of a connection apparatus 10 according to an embodiment of the present invention.
Figure 2:
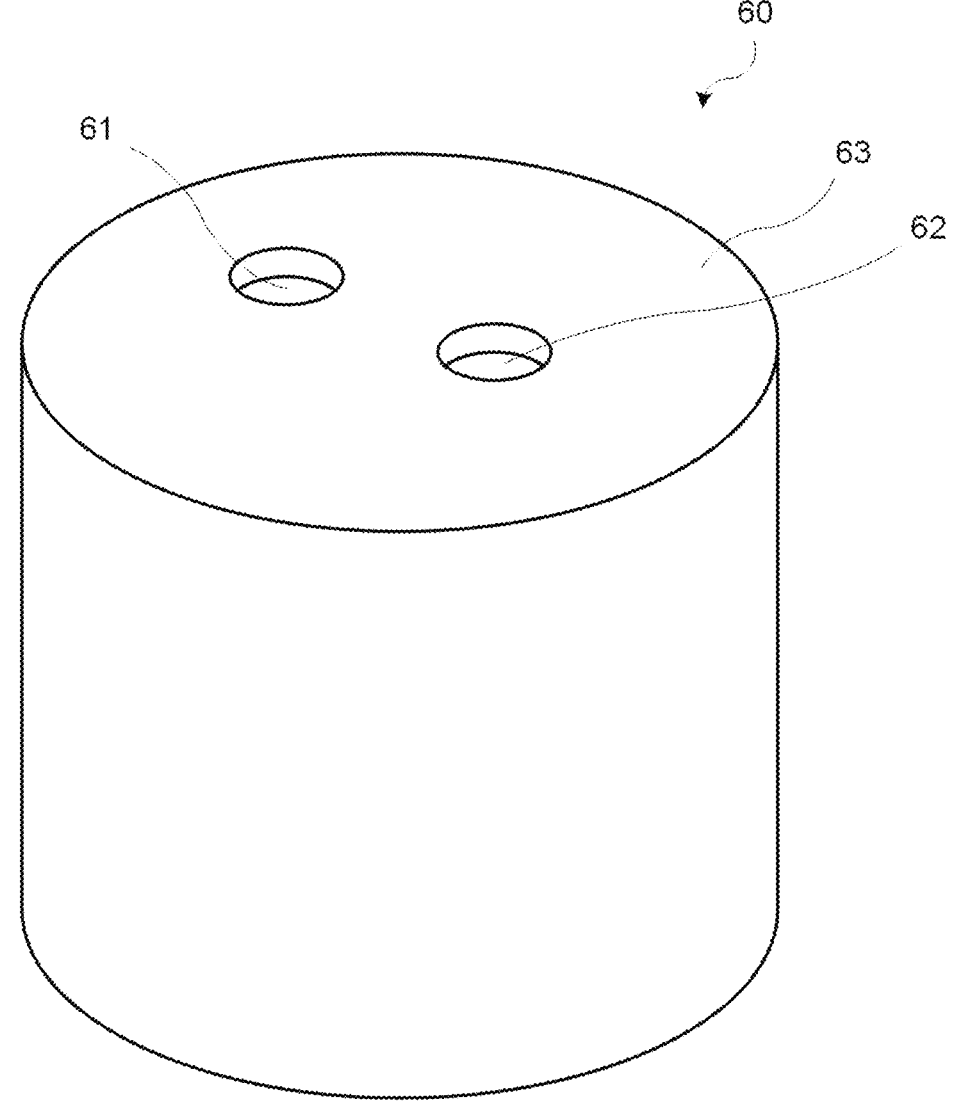
FIG. 2 shows an example of appearance of a portable device.

FIG. 1 shows an appearance of a connection apparatus 10 according to an embodiment of the present invention. FIG. 2 shows an example of appearance of a portable device. As shown in FIG. 1, the connection apparatus 10 comprises an electrode 11 as a first electrode, an electrode 12 as a second electrode, a fixing member 14, a housing upper portion 15, and a feeder 16. The connection apparatus 10 performs electrical connection with a portable device 60 and supplies power to the portable device 60 from a power supply (not shown) connected to the feeder 16. The connection apparatus 10 is set as an apparatus that is placed on a desk or washbasin shelf etc. in advance, a portable device is placed thereon, and both are electrically connected. Of course, utility form of the connection apparatus 10 is arbitrary.

As shown in FIG. 2, the portable device 60 has an electrode 61 and an electrode 62. The electrode 61 is an electrode in contact with the electrode 11, and the electrode 62 is an electrode in contact with the electrode 12. If the connection apparatus 10 is polarity-independent, such as power supplied through the connection apparatus 10 is AC power, the electrode 61 may be brought into contact with the electrode 12, and the electrode 62 may be brought into contact with the electrode 11.

The electrode 11 has conductivity and magnetic force. In other words, the electrode 11 is configured of a magnet having conductivity, e.g., magnetized hard magnetic material. Similarly, the electrode 12 has conductivity and magnetic force, and is configured of a magnet having conductivity, e.g., magnetized hard magnetic material. The magnetized hard magnetic material having conductivity is, for instance, an alnico magnet. A part of the electrode 11 protrudes from the housing upper portion 15, and a part of the electrode 12 also protrudes from the housing upper portion 15. The electrode 11 and the electrode 12 are electrically connected to a power supply 50 (not shown), respectively, the electrode 11 contacts the electrode 61 of the portable device 60, and the electrode 12 contacts the electrode 62 of the portable device 60, thereby power output from the power supply (not shown) is supplied to the portable device 60.

The fixing member 14 serves as a lower part of the housing of the connection apparatus 10 and is realized, for instance, by molding a plastic or other resin. The fixing member 14 is configured to fix the electrode 11 and the electrode 12 at an interval corresponding to the portable device 60, that is, at the same interval as an interval between the electrode 61 and the electrode 62.

The housing upper portion 15 is an upper part of the housing of the connection apparatus 10, and is realized by molding, for example, silicone rubber. The housing upper portion 15 is preferably an elastic material to prevent water or the like from entering inside from a protrusion part of the electrode 11 and the electrode 12, and an insulating material is required to prevent electric short circuit between the electrode 11 and the electrode 12.

The housing configuring of the fixing member 14 and the housing upper portion 15 comprises a through hole penetrating from an upper surface to a lower surface. Therefore, the housing upper portion 15 has a through hole 151. As the through hole 151 is designed to allow for drainage in case water droplets or the like adhere to the upper surface of the housing of the connection apparatus 10, the housing upper portion 15 as the upper surface of the housing preferably has an inclination descending from an edge portion 152 to the through hole 151.

The feeder 16 supplies power output by a power supply (not shown) to the connection apparatus 10, and is connected to the electrode 11 and the electrode 12 on one side and to a terminal or connector (not shown) on the other side.

The electrode 61 and the electrode 62 of the portable device 60 are disposed to form a recess on a placement surface 63 of the portable device 60. The placement surface 63 is a surface that serves as a lower surface when the portable device 60 is placed on a desk or washbasin shelf in a state where the portable device 60 is not connected to the connection apparatus 10. Therefore, the electrode 61 and the electrode 62 are formed in recess in such a manner that the portable device 60 stands upright when the portable device 60 is placed on a desk or washbasin shelf. Accordingly, the electrode 61 and the electrode 62 may be disposed so as to be substantially flush with the placement surface 63. If the electrode 61 and the electrode 62 are provided at a location other than the placement surface 63, the electrode 61 and the electrode 62 may form a projection. The electrode 61 and the electrode 62 need to have conductivity and configured of material such as soft magnetic material to adsorb to a magnet.

Figure 3:
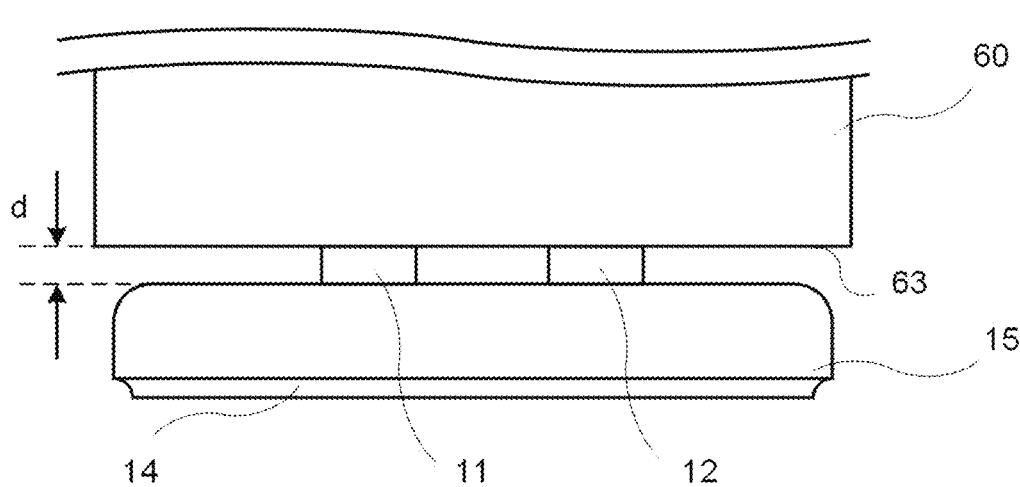
FIG. 3 shows a state of connection between the connection apparatus 10 and a portable device 60.

FIG. 3 shows a state of connection between the connection apparatus 10 and the portable device 60. The electrode 61 and the electrode 62 of the portable device 60 are connected to the electrode 11 and the electrode 12 of the connection apparatus 10, respectively. Since the electrode 11 and the electrode 12 have magnetic force, the electrode 61 and the electrode 62 are adsorbed, thus the connection is easy and reliable. As shown in FIG. 3, height of the electrode 11 and the electrode 12 are adjusted in such a manner that an interval between the placement surface 63 of the portable device 60 and the housing upper portion 15 of the connection apparatus 10 becomes a predetermined interval d. Consequently, only the electrode 61 and the electrode 62 of the portable device 60 are in contact with the connection apparatus 10, and electrical connection defects are unlikely to occur. The interval d is, for instance, 0.2 mm. Since positioning of the portable device 60 with respect to the connection apparatus 10 can be performed only by the electrode 61 and the electrode 62, other magnetic force or guideline for positioning is unnecessary.

Figure 4:
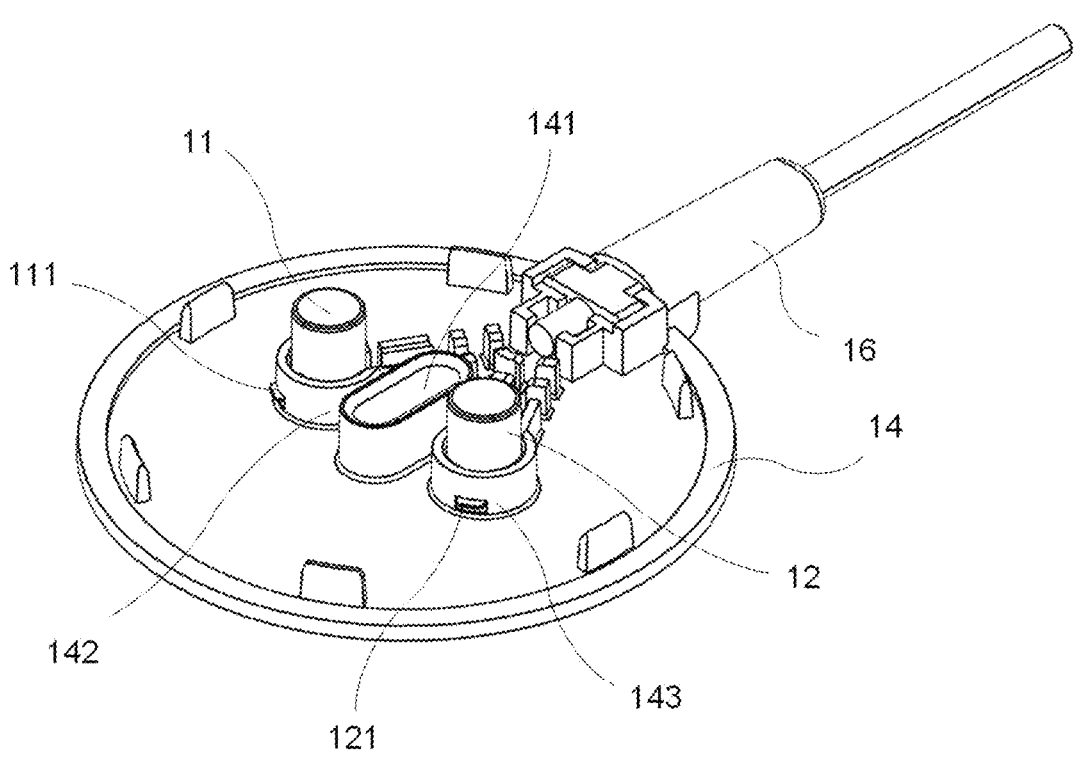
FIG. 4 shows an internal configuration of the connection apparatus 10.

Subsequently, details of the connection apparatus 10 will be described. FIG. 4 shows an internal configuration of the connection apparatus 10. As shown in the drawing, a through hole 141, a fixing frame 142, and a fixing frame 143 are integrally molded in the fixing member 14. The through hole 141 forms a through hole of the connection apparatus 10 together with the through hole 151 of the housing upper portion 15. The fixing frame 142 is a place where the electrode 11 is disposed and the fixing frame 143 is a place where the electrode 12 is disposed. The electrode 11 has a protrusion portion 111 which is a first protrusion portion, and the protrusion portion 111 is fitted with the fixing member 14, thereby fixing the electrode 11. Similarly, the electrode 12 has a protrusion portion 121 which is a second protrusion portion, and the protrusion portion 121 is fitted with the fixing member 14 to fix the electrode 22.

Figure 5:
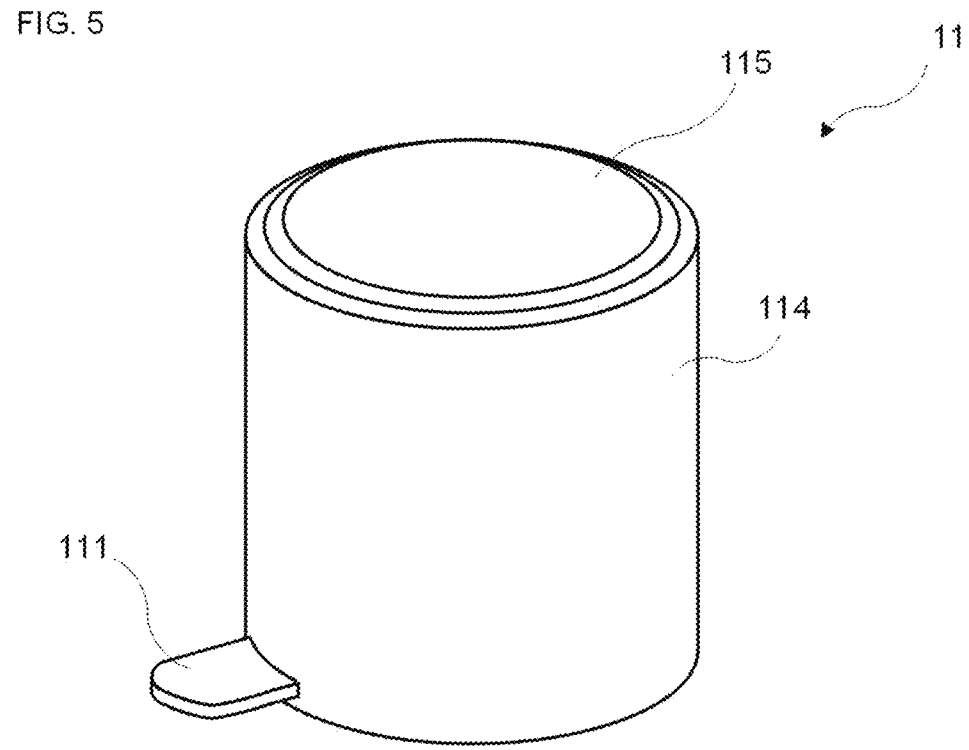
FIG. 5 is a diagram for illustrating shape of an electrode 11.

The electrode 11 and the electrode 12 will be described hereinafter. FIG. 5 is a diagram illustrating shape of the electrode 11. As shown in the drawing, the electrode 11 has a shape having a protrusion portion 111, a columnar portion 114, and a planar portion 115. The protrusion portion 111 is a part to be fitted with the fixing member 14 when the electrode 11 is disposed on the fixing member 14. The columnar portion 114 corresponds to a side portion of a cylindrical or prismatic shape (cylindrical shape in the drawing). The planar portion 115 is a part in contact with the electrode 61 and is a plane which becomes substantially horizontal when the connection apparatus 10 is installed on a horizontal surface. The planar portion 115 may be a plane intersecting the horizontal surface at a predetermined angle, as described later. In other words, at least a part of the electrode 11 has columnar shape, and at least a part of the electrode 11 has planar shape.

Although drawing illustration is omitted, similar to the electrode 11, at least a part of the electrode 12 has columnar shape, and at least a part of the electrode 12 has planar shape.

When supplying DC power to the portable device 60, for instance, when the power supply is USB (Universal Serial Bus), the connection apparatus 10 uses the electrode 11 as a positive electrode and the electrode 12 as a negative electrode. In this case, by connecting the electrode 11 to the electrode 61 and connecting the electrode 12 to the electrode 62, DC voltage is correctly applied to the portable device 60, but if the electrode 11 is connected to the electrode 62, and the electrode 12 is connected to the electrode 61, DC voltage with reverse polarity is applied to the portable device 60. Although the portable device 60 may have backflow prevention or rectification functions, if the portable device 60 do not have these functions, it is necessary to perform positioning for correctly connection between the electrode 11 and the electrode 61 as well as correctly connection between the electrode 12 and the electrode 62. Here, several examples of positioning method will be described.

First, a positioning method with magnetic force will be illustrated. When positioning by magnetic force, a magnetic pole of the electrode 11 in contact with the electrode 61 of the portable device 60 and a magnetic pole of the electrode 12 in contact with the electrode 62 of the portable device 60 have different polarity. For example, if the electrode 11 is N-pole, the electrode 12 should be S-pole. In this case, if the electrode 61 is S-pole and the electrode 62 is N-pole in the portable device 60, the connection apparatus 10 and the portable device 60 are correctly connected.

Next, a positioning method by making at least one of shape and size of the electrode 12 different from that of the electrode 11 will be described. In the method, at least one of shape and size of the electrode 11 and the electrode 12 is made different from each other, thereby making it physically difficult to connect the portable device 60 in a opposite position. Since the magnetic force allows for easy connection between the electrodes in positive position, connection at opposite position can be even slightly difficult, and it is unnecessary to increase difficulty to such an extent that connection becomes impossible.

Figure 6:
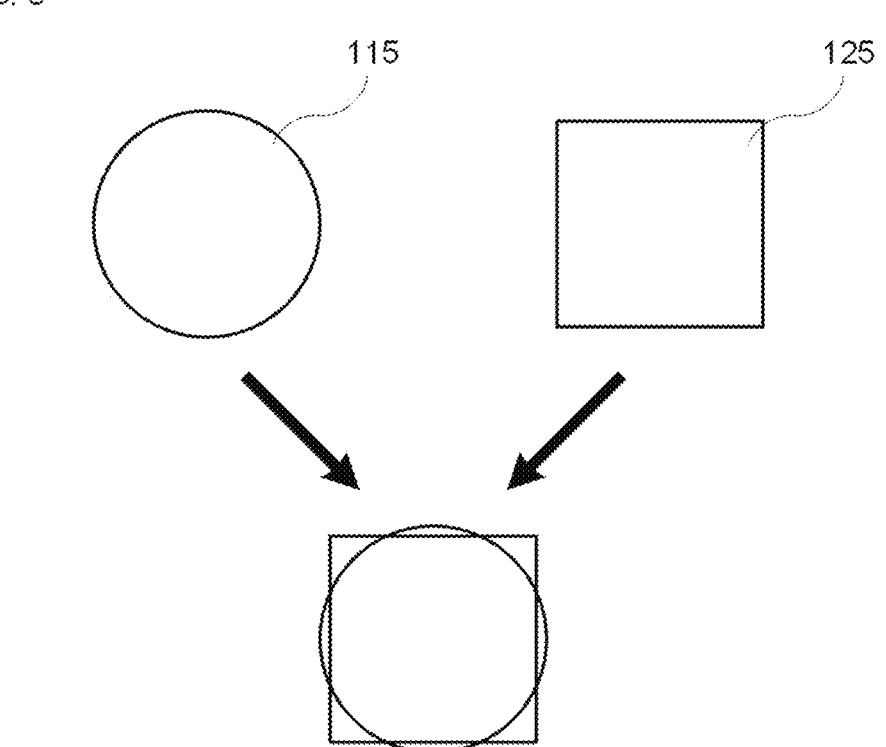
FIG. 6 is a diagram for illustrating a positioning method.
Figure 7:
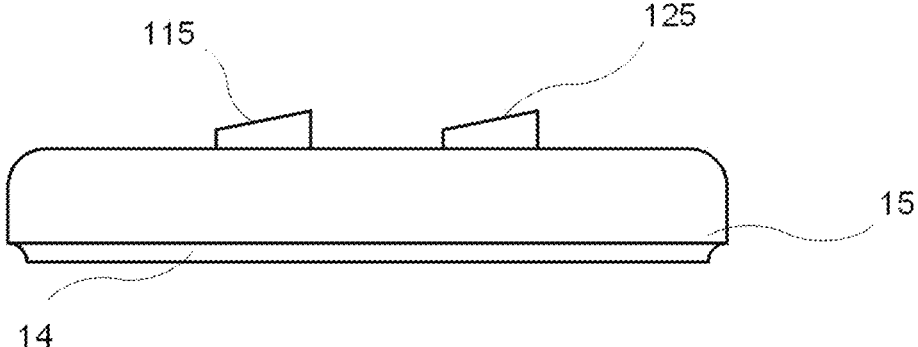
FIG. 7 is a diagram for illustrating a positioning method.
Figure 8:
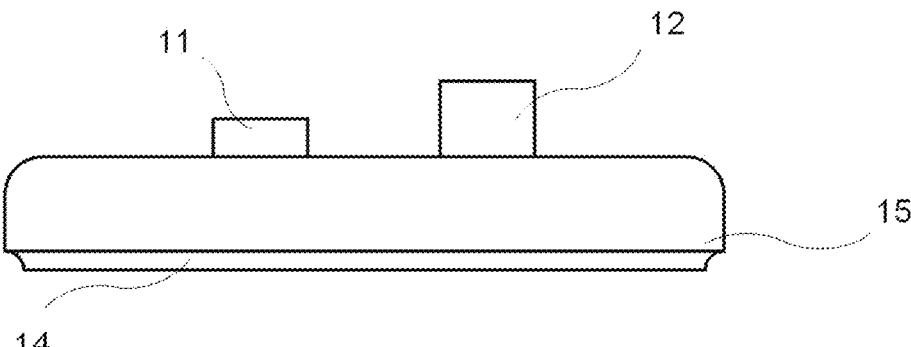
FIG. 8 is a diagram for illustrating a positioning method.

Here, several examples of the positioning method by making at least one of shape and size of the electrode 12 different from that of the electrode 11 will be described. FIGS. 6 through 8 are diagrams for illustrating the positioning method. Although the electrode 11 and the electrode 12 are mainly described here, it is necessary to allow shape of the electrode 61 and the electrode 62 to be corresponded on the portable device 60 side.

In the example shown in FIG. 6, the planar portion 115 is circular and a planar portion 125 is square. In such a case, for instance, if diameter of the planar portion 115 is 5.5 mm and one side of the planar portion 125 is 5 mm, connection at an opposite position becomes difficult.

Although not shown in the drawing, connection at the opposite position becomes difficult even if the planar portion 115 and the planar portion 125 are formed in same rectangular shape but with different longitudinal directions.

The example shown in FIG. 7 is a planar surface where the planar portion 115 and the planar portion 125 intersect a horizontal surface at a predetermined angle. In this case, it becomes difficult for the electrode 11 and the electrode 62 as well as the electrode 12 and the electrode 61 to contact with each other on a surface at an opposite position, and adsorption by magnetic force becomes weak.

In the example shown in FIG. 8, length (height) of a part protruding from the housing upper portion 15 is different for the electrode 11 and the electrode 12. In this case, the electrode 11 and the electrode 62 do not contact with each other at the opposite position.

Note that the above description is merely an example. Other methods, such as simply making the electrode 11 and the electrode 12 circular with different diameters, would make it difficult for connection at the opposite position as well.

2. Second Embodiment

Figure 9:
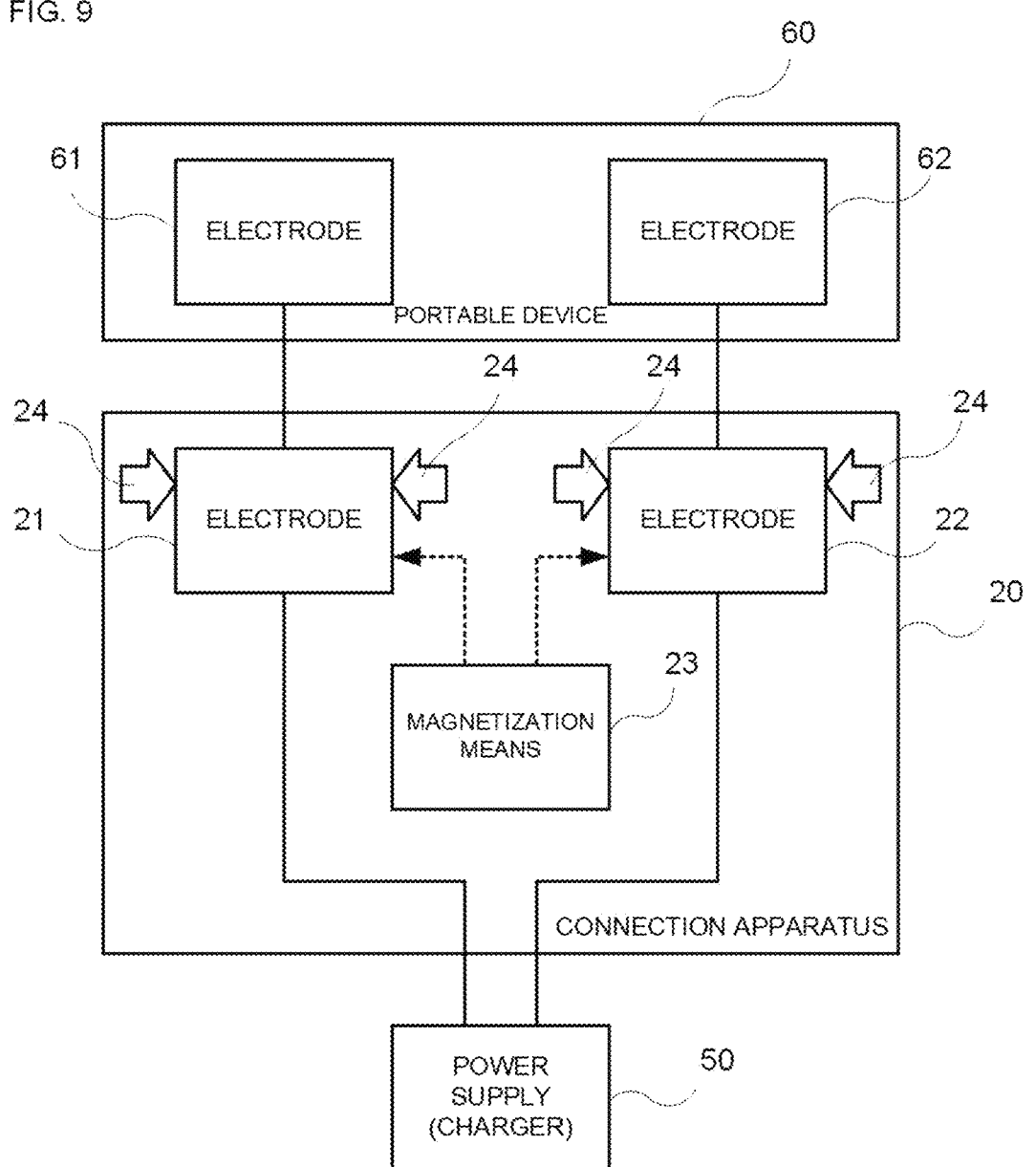
FIG. 9 shows a basic configuration of a connection apparatus 20.

FIG. 9 shows a basic configuration of a connection apparatus 20. As shown in the drawing, the connection apparatus 20 comprises an electrode 21, which is a first electrode, an electrode 22, which is a second electrode, a magnetization means 23, and a fixing member 24. The connection apparatus 20 performs electrical connection with a portable device 60 and supplies power from a power supply 50 to the portable device 60.

Both the electrode 21 and the electrode 22 are configured by including soft magnetic material having conductivity. The soft magnetic material is easily magnetized by applying a magnetic field and returns to original state by removing the magnetic field, and the soft magnetic material having conductivity is, for instance, iron. The electrode 21 and the electrode 22 are electrically connected to the power supply 50, respectively, when the electrode 21 contacts the electrode 61 of the portable device 60, and the electrode 22 contacts the electrode 62 of the portable device 60, power output by the power supply 50 is supplied to the portable device 60.

The magnetization means 23 enables magnetization of the electrode 21 and the electrode 22, respectively, and one or two magnets, which are magnetized hard magnetic materials, may be used. When one magnet is used, it is necessary to insulate between the electrode 21 and the electrode 22. An electromagnet using coil or the like may be used instead of magnet.

The fixing member 24 enables fixing the electrode 21 and the electrode 22 at an interval corresponding to the portable device 60, i.e., same interval as an interval between the electrode 61 and the electrode 62.

Figure 10:
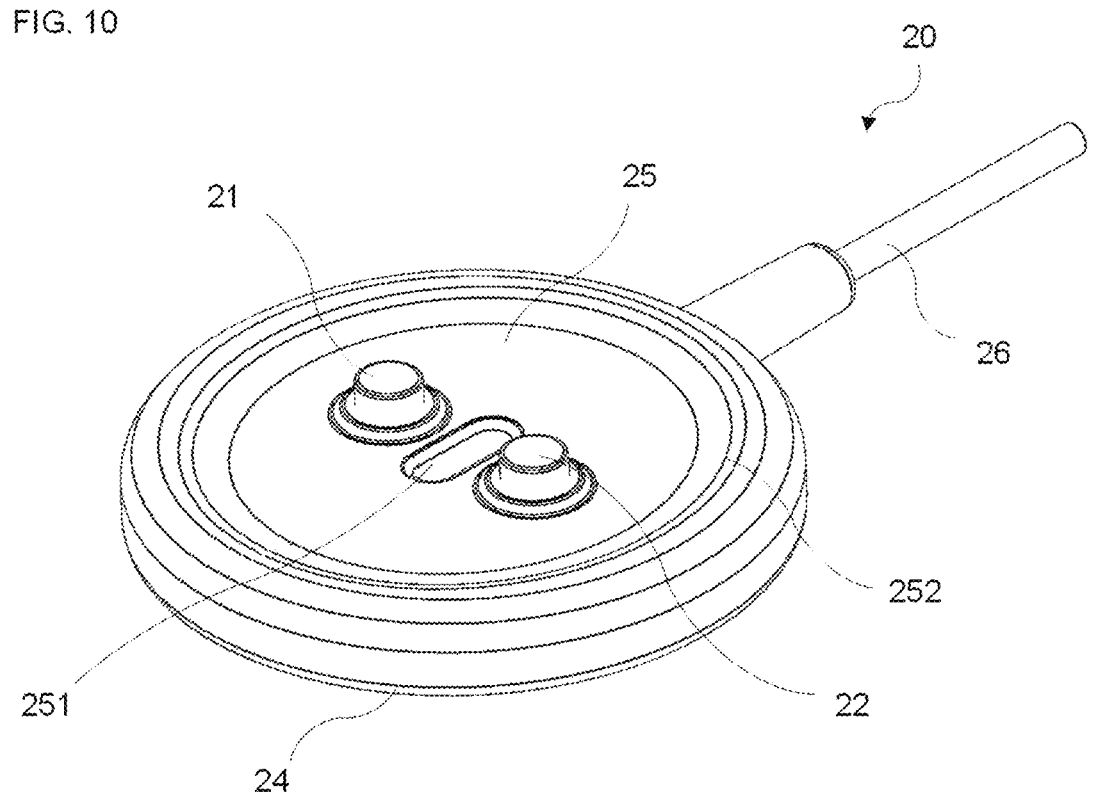
FIG. 10 shows an appearance of the connection apparatus 20.

FIG. 10 shows an appearance of the connection apparatus 20. As shown in the drawing, the connection apparatus 20 comprises the electrode 21, the electrode 22, the fixing member 24, a housing upper portion 25, and a feeder 26. The connection apparatus 20 is set as an apparatus that is placed on a desk or washbasin shelf etc. in advance, a portable device is placed thereon, and both are electrically connected. Of course, utility form of the connection apparatus 20 is arbitrary.

The electrode 21 and the electrode 22 are magnetized by a first magnetization portion and a second magnetization portion that correspond to the magnetization means 23. The first magnetization portion and the second magnetization portion will be described later. A part of the electrode 21 protrudes from the housing upper portion 25, and a part of the electrode 22 also protrudes from the housing upper portion 25.

The fixing member 24 serves as a lower part of a housing of the connection apparatus 20 and is realized, for instance, by molding a plastic or other resin. Details of the fixing member 24 will be described later.

The housing upper portion 25 is an upper part of the housing of the connection apparatus 20, and is realized by molding, for example, silicone rubber. The housing upper portion 25 is preferably an elastic material to prevent water or the like from entering inside from a protrusion part of the electrode 21 and the electrode 22, and an insulating material is required to prevent electric short circuit between the electrode 21 and the electrode 22.

The housing configuring of the fixing member 24 and the housing upper portion 25 comprises a through hole penetrating from an upper surface to a lower surface. Therefore, the housing upper portion 25 has a through hole 251. As the through hole 251 is designed to allow for drainage in case water droplets or the like adhere to the upper surface of the housing of the connection apparatus 20, the housing upper portion 25 as the upper surface of the housing preferably has an inclination descending from an edge portion 252 to the through hole 251.

The feeder 26 supplies power output by a power supply (not shown) to the connection apparatus 20, and is connected to the electrode 21 and the electrode 22 on one side and to a terminal or connector (not shown) on the other side.

Figure 11:
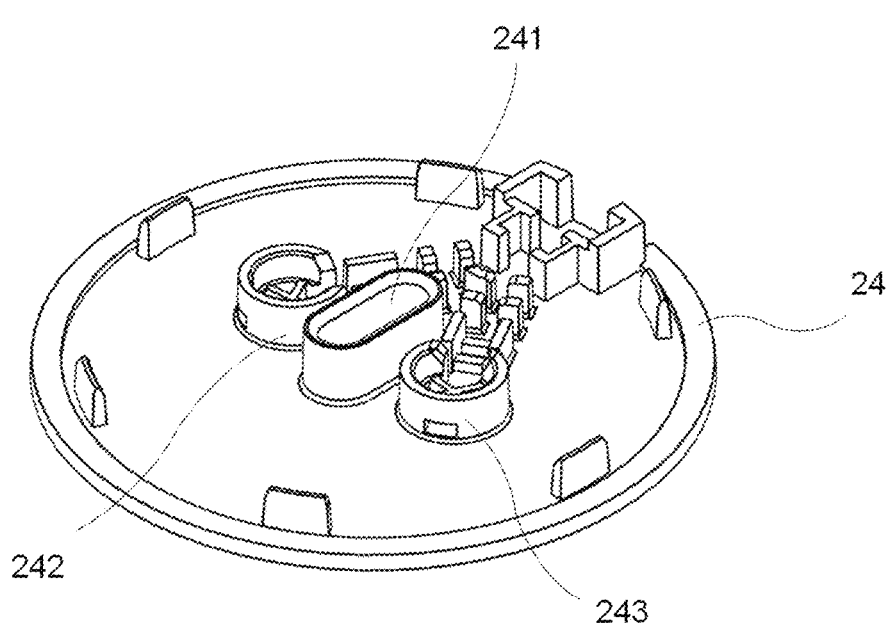
FIG. 11 shows an internal configuration of the connection apparatus 20.
Figure 12:
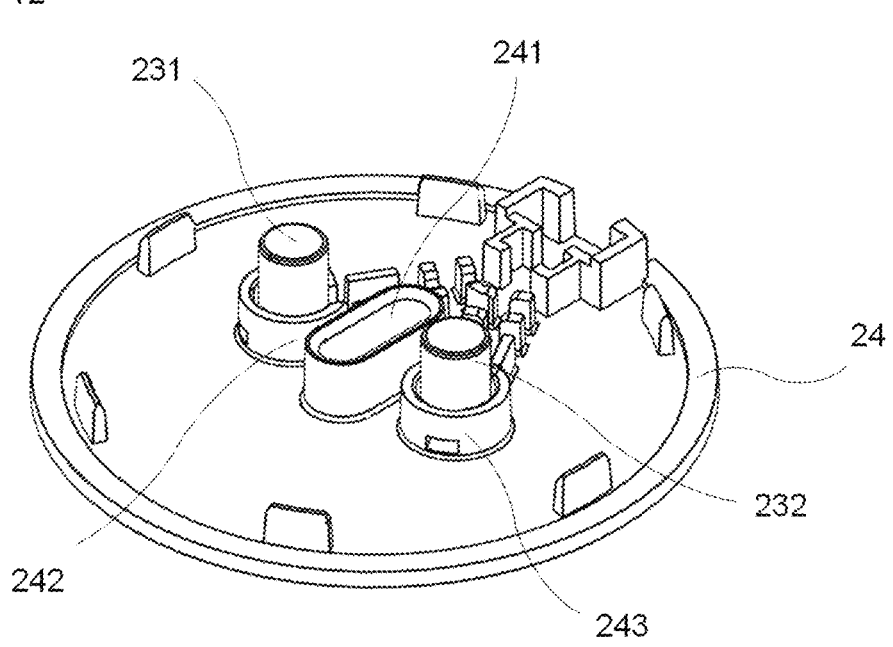
FIG. 12 shows an internal configuration of the connection apparatus 20.
Figure 13:
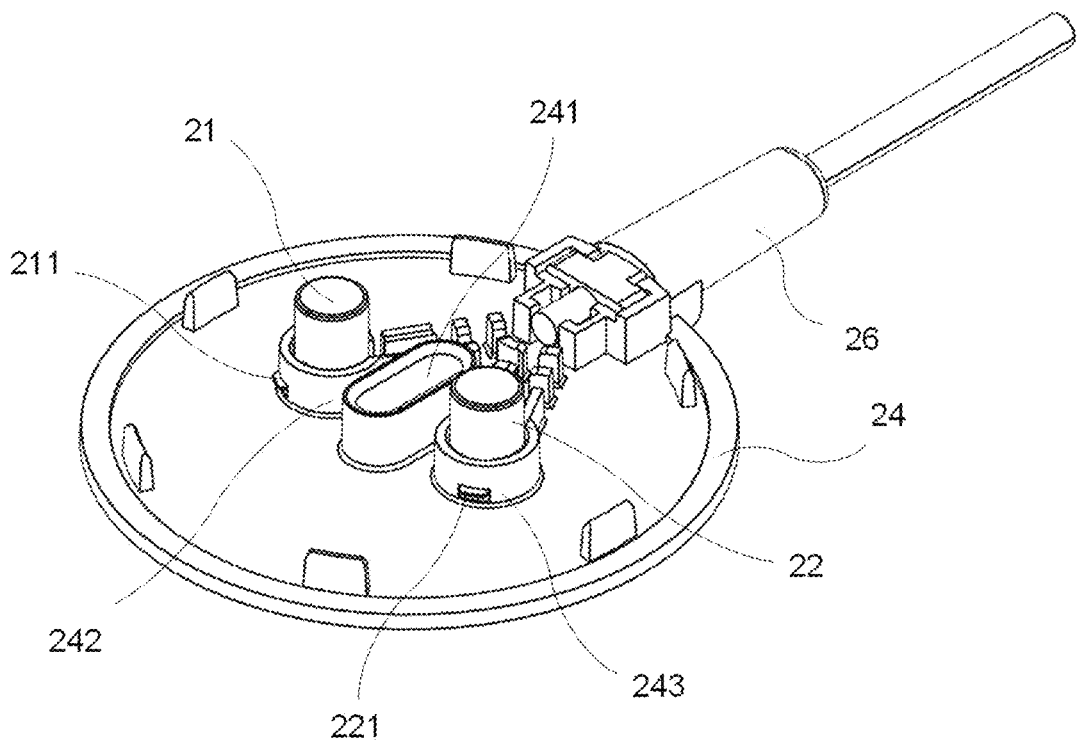
FIG. 13 shows an internal configuration of the connection apparatus 20.

Subsequently, details of the connection apparatus 20 will be described. FIGS. 11 to 13 show internal configuration of the connection apparatus 20. As shown in FIG. 11, a through hole 241, a fixing frame 242, and a fixing frame 243 are integrally molded in the fixing member 24. The through hole 241 forms a through hole of the connection apparatus 20 together with the through hole 251 of the housing upper portion 25.

As shown in FIG. 12, a magnet 231 as the first magnetization portion is disposed on the fixing frame 242, and a magnet 232 as the second magnetization portion is disposed on the fixing frame 243. The magnet 231 and the fixing frame 242 need not be directly fixed, and the magnet 232 and the fixing frame 243 need not be directly fixed. The magnet 231 includes a magnetized hard magnetic material, and the magnet 232 includes a magnetized hard magnetic material.

As shown in FIG. 13, the electrode 21 is disposed to encompass the magnet 231 and the electrode 22 is disposed to encompass the magnet 232. As a result, the magnet 231 is adsorbed to the electrode 21, and the magnet 231 magnetizes the electrode 21. Similarly, the magnet 232 is adsorbed to the electrode 22, and the magnet 232 magnetizes the electrode 22. The electrode 21 has a protrusion portion 211 as a first protrusion portion, and the protrusion portion 211 fits with the fixing member 24 to fix the electrode 21. Similarly, the electrode 22 has a protrusion portion 221 as a second protrusion portion, and the protrusion portion 221 fits with the fixing member 24 to fix the electrode 22.

Figure 14:
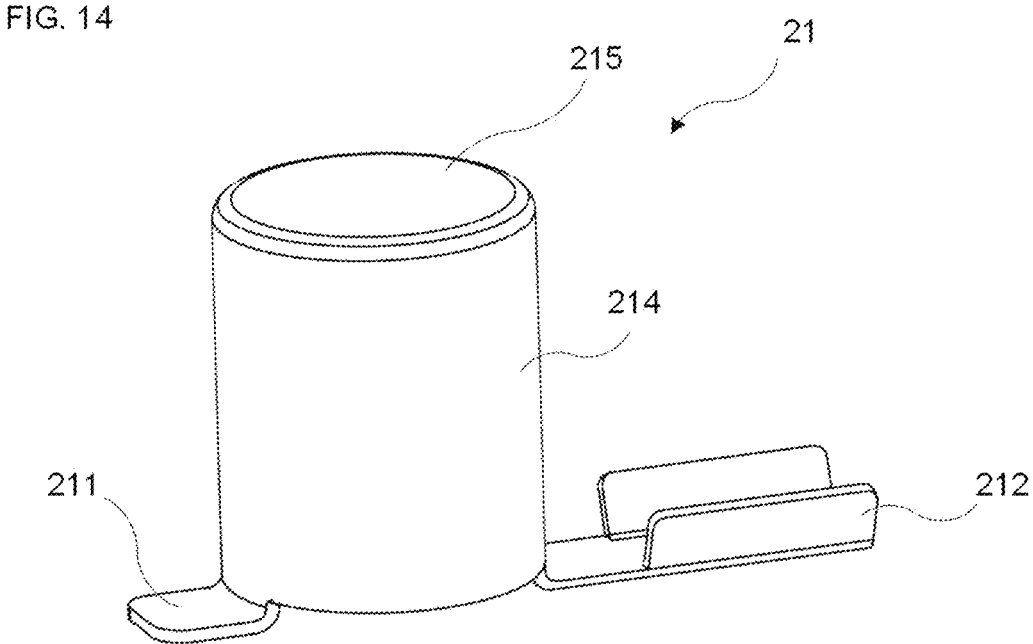
FIG. 14 is a diagram for illustrating shape of an electrode 21.
Figure 15:
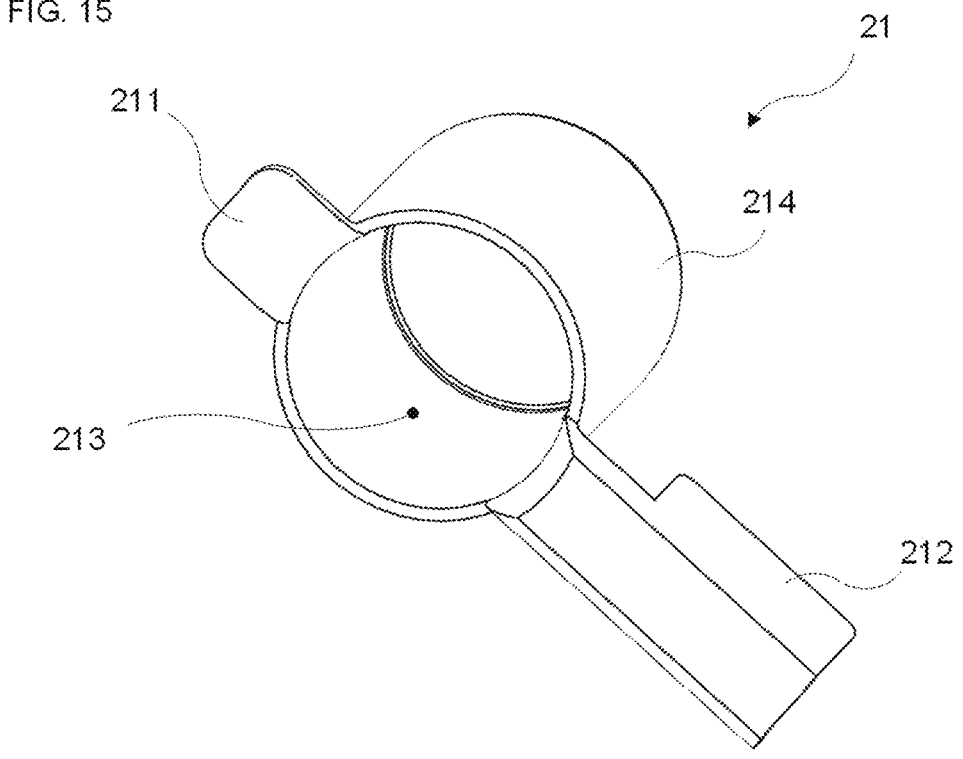
FIG. 15 is a diagram for illustrating shape of an electrode 21.

Here, the electrode 21 and the electrode 22 will be described. FIGS. 14 and 15 are diagrams for illustrating shape of the electrode 21. As shown in FIGS. 14 and 15, the electrode 21 has the protrusion portion 211, a claw portion 212, a hollow portion 213, a cylindrical portion 214, and a planar portion 215. The protrusion portion 211 is a part that fits with the fixing member 24 when the electrode 21 is disposed on the fixing member 24. The claw portion 212 is a part connected with the feeder 26 and is connected to the feeder 26 by being caulked. The hollow portion 213 is a part that houses the magnet 231. The cylindrical portion 214 corresponds to a side portion of a cylindrical or square cylindrical shape (cylindrical in the drawing). The planar portion 215 is a part in contact with an electrode 71 and is a plane which becomes substantially horizontal when the connection apparatus 20 is installed on a horizontal surface. The planar portion 215 may be a plane intersecting the horizontal surface at a predetermined angle, as described later. In other words, at least a part of the electrode 21 has cylindrical shape, and at least a part of the electrode 21 has planar shape. Material of the electrode 21 may be any material such as iron or stainless steel, as long as it has conductivity and is adsorbed to a magnet such as soft magnetic material. Although there is no restriction on thickness of the electrode 21, it is desirable to use a thickness of about 0.1 mm to 0.3 mm, preferably 0.2 mm, in terms of ease of processing and weight.

Similar to the electrode 21, at least a part of the electrode 22 has cylindrical shape, and at least a part of the electrode 22 has planar shape.

Positioning when connecting the connection apparatus 20 and the portable device 60 is the same as in the first embodiment, thus illustration thereof is omitted. Of course, DC power can be supplied to the portable device 60 as in the case of the first embodiment.

3. Third Embodiment

Figure 16:
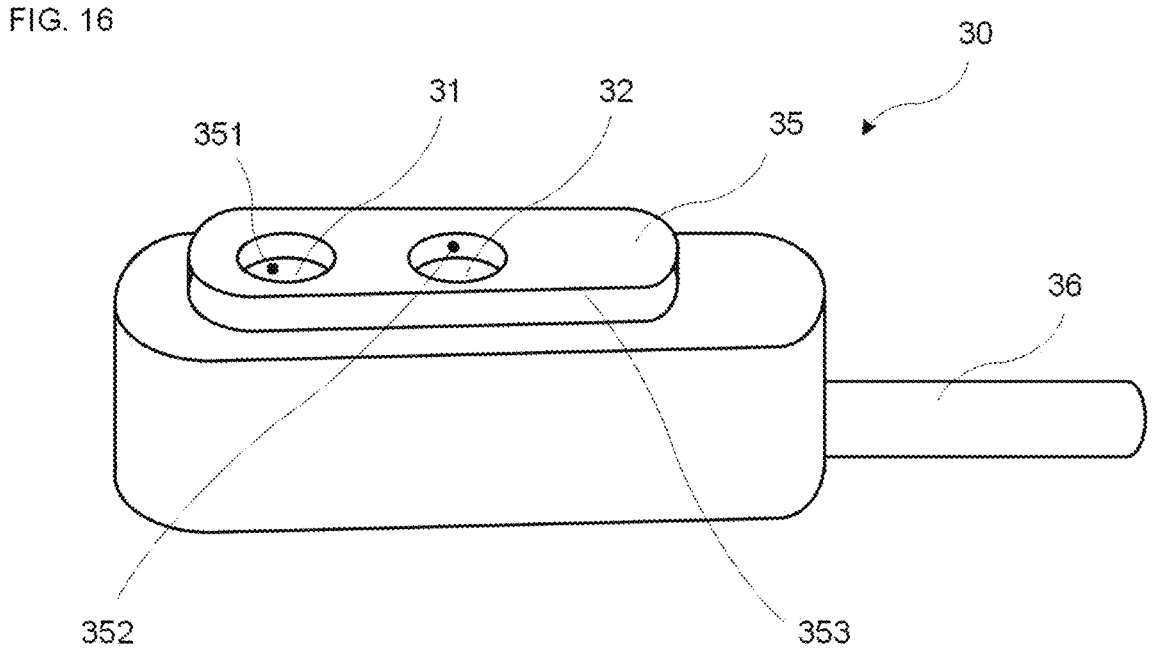
FIG. 16 shows an appearance of a connection apparatus 30.

FIG. 16 shows an appearance of a connection apparatus 30. As shown in the drawing, the connection apparatus 30 comprises an electrode 31, an electrode 32, a housing 35, and a feeder 36. The electrode 31 and the electrode 32 are magnetized by a magnetization means in the same manner as the electrode 11 and the electrode 12 in the first embodiment. The housing 35 comprises a hole portion 351 as a first hole portion and a hole portion 352 as a second hole portion. A recess is formed by a part of the electrode 31 as the first electrode and the hole portion 351, and a recess is formed by a part of the electrode 32 as the second electrode and the hole portion 352. Further, the housing 35 may have an inclination descending from the recess to an edge portion 353. The feeder 36 supplies power output by a power supply (not shown) to the connection apparatus 30.

Although the connection apparatus 30 basically has the same configuration as the connection apparatus 20, the electrode 31 and the electrode 32 can be configured as flat plates and adsorbs magnet respectively.

The connection apparatus 30 is designed to be movable by itself and connected to a portable device placed on a desk, a washbasin shelf, or the like. In this case, the portable device is assumed to have an electrode disposed on a place other than a placement surface. Of course, utility form of the connection apparatus 30 is arbitrary.

4. Fourth Embodiment

Figure 17:
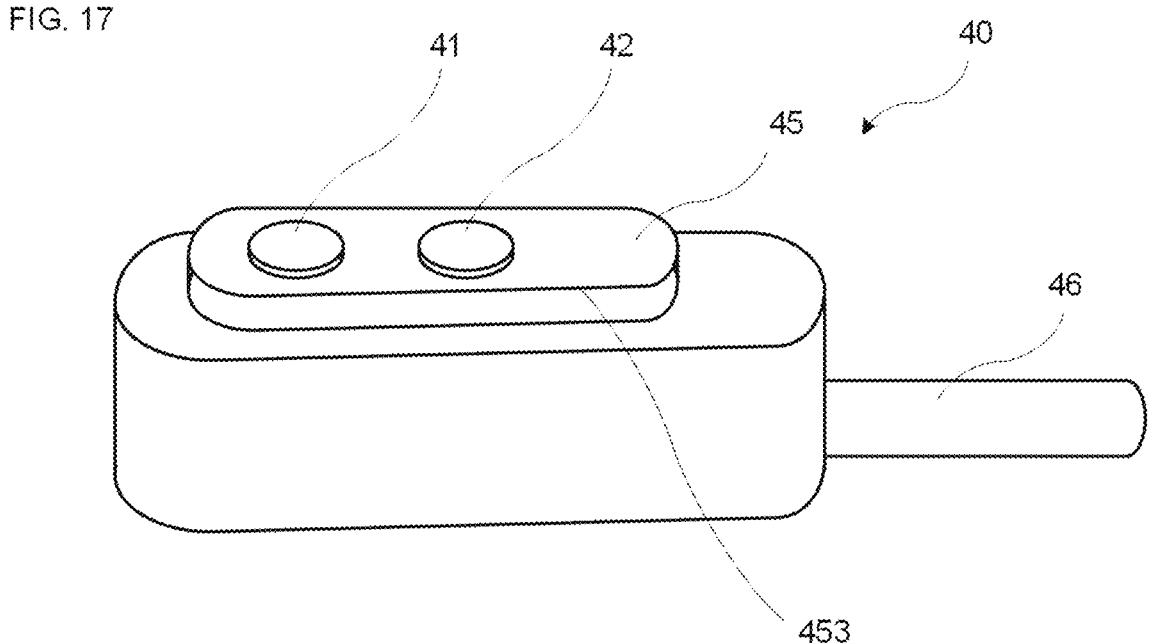
FIG. 17 shows an appearance of a connection apparatus 40.

FIG. 17 shows an appearance of a connection apparatus 40. As shown in the drawing, the connection apparatus 40 comprises an electrode 41, an electrode 42, a housing 45, and a feeder 46. The electrode 41 and the electrode 42 are magnetized by a magnetization means in the same manner as the electrode 21 and the electrode 22 in the second embodiment. The housing 45 may have an inclination descending from a location where the electrode 41 and the electrode 42 are disposed to an edge portion 453. The feeder 46 supplies power output by a power supply (not shown) to the connection apparatus 30.

Although the connection apparatus 40 is similar to the connection apparatus 30, the electrode 41 and the electrode 42 are substantially at the same height as a surface of the housing 45, which allows for better drainage.

5. Others

The configurations described in the first embodiment to the fourth embodiment can be combined as appropriate. Specifically, the electrode of the type of the connection apparatus 20 installed on a desk, etc. described in the second embodiment can be disposed on a recess or on approximately the same surface as the housing instead of protruding from the housing, and the electrode of the type of the connection apparatus that allows the connection apparatus side to move, which is described in the third embodiment and the fourth embodiment, can be made to protrude from the housing.

Furthermore, each connection apparatus described in the first to fourth embodiments may be incorporated into the portable device side, and the electrodes on the portable device side can be magnetized.

The present invention may be provided in each of the following manners.

The connection apparatus, wherein: the first electrode is configured of magnetized hard magnetic material, and the second electrode is configured of magnetized hard magnetic material.

The connection apparatus, wherein: at least a part of the first electrode has columnar shape, and at least a part of the second electrode has columnar shape.

The connection apparatus, comprising: a magnetization means, wherein the first electrode is configured to include soft magnetic material having conductivity, the second electrode is configured to include soft magnetic material having conductivity, and the magnetization means is configured to magnetize the first electrode and the second electrode.

The connection apparatus, wherein: the magnetization means comprises a first magnetization portion and a second magnetization portion, the first magnetization portion is configured to include magnetized hard magnetic material, the second magnetization portion is configured to include magnetized hard magnetic material, and the first magnetization portion magnetizes the first electrode, and the second magnetization portion magnetizes the second electrode.

The connection apparatus, wherein: the first electrode encompasses the first magnetization portion, and the second electrode encompasses the second magnetization portion.

The connection apparatus, wherein: at least a part of the first electrode has cylindrical shape, and at least a part of the second electrode has cylindrical shape.

The connection apparatus, wherein: at least a part of the first electrode has planar shape, and at least a part of the second electrode has planar shape.

The connection apparatus, wherein: the first electrode has a first protrusion portion, the first protrusion portion fits with the fixing portion to fix the first electrode, the second electrode has a second protrusion portion, and the second protrusion portion fits with the fixing portion to fix the second electrode.

The connection apparatus, wherein: the first electrode and the second electrode supply DC power to the portable device, the first electrode is a positive electrode, and the second electrode is a negative electrode.

The connection apparatus, wherein: a magnetic pole at a part of the first electrode in contact with the portable device and a magnetic pole at a part of the second electrode in contact with the portable device have different polarity.

The connection apparatus, wherein: the first electrode and the second electrode differ from each other at least in one of shape and size.

The connection apparatus, comprising: a housing, wherein a part of the first electrode and a part of the second electrode protrude from the housing.

The connection apparatus, wherein: the housing includes a through hole penetrating from an upper surface to a lower surface, and the upper surface has an inclination descending from an edge portion to the through hole.

The connection apparatus, comprising: a housing including a first hole portion and a second hole portion, wherein a recess of the housing is formed by a part of the first electrode and the first hole portion, and a recess of the housing is formed by a part of the second electrode and the second hole portion.

The connection apparatus, wherein: the housing has an inclination descending from the recess to an edge portion.

Of course, the present invention is not limited thereto.

REFERENCE SIGNS LIST

10: Connection apparatus
11: Electrode
12: Electrode
14: Fixing member
15: Housing upper portion
16: Feeder
20: Connection apparatus
21: Electrode
22: Electrode
23: Magnetization Means
24: Fixing member
25: Housing upper portion
26: Feeder
30: Connection apparatus
31: Electrode
32: Electrode
35: Housing
36: Feeder
40: Connection apparatus
41: Electrode
42: Electrode
45: Housing
46: Feeder
50: Power supply
60: Portable device
61: Electrode
62: Electrode
63: Placement surface 71: Electrode
111: Protrusion portion
114: Columnar portion
115: Planar portion
121: Protrusion portion
125: Planar portion
141: Through hole
142: Fixing frame
143: Fixing frame
151: Through hole
152: Edge portion
211: Protrusion portion
212: Claw portion
213: Hollow portion
214: Cylindrical portion
215: Planar portion
221: Protrusion portion
225: Planar portion
231: Magnet
232: Magnet
241: Through hole
242: Fixing frame
243: Fixing frame
251: Through hole
252: Edge portion
351: Hole portion
352: Hole portion
353: Edge portion
453: Edge portion

What is claimed is:

1. A connection apparatus for electrical connection with a portable device having a pair of device-side electrodes protruded therefrom, comprising:

a first electrode having conductivity and magnetic force, the first electrode having a first plane;

a second electrode having conductivity and magnetic force, the second electrode having a second plane; and a housing including a fixing member configured to fix the first electrode and the second electrode at an interval corresponding to the pair of device-side electrodes of the portable device, the housing accommodating the first electrode and the second electrode, and the housing including an elongated projecting portion having a planar surface on which a first hole portion and a second hole portion open, wherein a first recess of the housing is formed by the first plane of the first electrode and the first hole portion, a second recess of the housing is formed by the second plane of the second electrode and the second hole portion, and the first and second recesses are disposed asymmetrically with respect to a line that passes through a midpoint of a longitudinal direction of the planar surface and extends, within the planar surface, perpendicular to the longitudinal direction, wherein the portable device is configured to be positioned with respect to the connection apparatus by inserting one of the device-side electrodes into the first recess, and making surface contact between the one device-side electrode and the first plane of the first electrode, and by inserting the other device-side electrode into the second recess and, making surface contact between the other device-side electrode and the second plane of the second electrode.

2. The connection apparatus according to claim 1, wherein:

the first electrode is configured of magnetized hard magnetic material, and the second electrode is configured of magnetized hard magnetic material.

3. The connection apparatus according to claim 1, wherein:

at least a part of the first electrode has columnar shape, and at least a part of the second electrode has columnar shape.

4. The connection apparatus according to claim 1, comprising:

a magnetization means, wherein the first electrode is configured to include soft magnetic material having conductivity, the second electrode is configured to include soft magnetic material having conductivity, and the magnetization means is configured to magnetize the first electrode and the second electrode.

5. The connection apparatus according to claim 4, wherein:

the magnetization means comprises a first magnetization portion and a second magnetization portion, the first magnetization portion is configured to include magnetized hard magnetic material, the second magnetization portion is configured to include magnetized hard magnetic material, and the first magnetization portion magnetizes the first electrode, and the second magnetization portion magnetizes the second electrode.

6. The connection apparatus according to claim 5, wherein:

the first electrode encompasses the first magnetization portion, and the second electrode encompasses the second magnetization portion.

7. The connection apparatus according to claim 6, wherein:

at least a part of the first electrode has cylindrical shape, and at least a part of the second electrode has cylindrical shape.

8. The connection apparatus according to claim 1, wherein:

the first electrode has a first protrusion portion, the first protrusion portion fits with the fixing portion to fix the first electrode, the second electrode has a second protrusion portion, and the second protrusion portion fits with the fixing portion to fix the second electrode.

9. The connection apparatus according to claim 1, wherein:

the first electrode and the second electrode supply DC power to the portable device, the first electrode is a positive electrode, and the second electrode is a negative electrode.

10. The connection apparatus according to claim 9, wherein:

a magnetic pole at a part of the first electrode in contact with the portable device and a magnetic pole at a part of the second electrode in contact with the portable device have different polarity.

11. The connection apparatus according to claim 9, wherein:

the first electrode and the second electrode differ from each other at least in one of shape and size.

12. The connection apparatus according to claim 1, wherein:

the housing includes a through hole penetrating from an upper surface to a lower surface, and the upper surface has an inclination descending from an edge portion to the through hole.

13. The connection apparatus according to claim 1, wherein:

the housing has an inclination descending from the recess to an edge portion.

14. The connection apparatus according to claim 1, wherein:

when the one device-side electrode is inserted into the first recess and the other device-side electrode is inserted into the second recess, an outer peripheral surface of each device-side electrode makes contact with an inner peripheral surface of the corresponding recess.

* * * * *